(12) United States Patent
Simoni et al.

(10) Patent No.: US 9,207,254 B2
(45) Date of Patent: Dec. 8, 2015

(54) ACCELEROMETER WITH LOW SENSITIVITY TO THERMO-MECHANICAL STRESS

(71) Applicant: Maxim Integrated Products, Inc., San Jose, CA (US)

(72) Inventors: Barbara Simoni, Bareggio (IT); Luca Coronato, Corsico (IT); Gabriele Cazzaniga, Rosate (IT)

(73) Assignee: Maxim Integrated Products, Inc., San Jose, CA (US)

( * ) Notice: Subject to any disclaimer, the term of this patent is extended or adjusted under 35 U.S.C. 154(b) by 376 days.

(21) Appl. No.: 13/770,726

(22) Filed: Feb. 19, 2013

(65) Prior Publication Data

US 2014/0230550 A1  Aug. 21, 2014

(51) Int. Cl.
*G01P 15/125* (2006.01)
*G01P 15/08* (2006.01)

(52) U.S. Cl.
CPC ....... *G01P 15/125* (2013.01); *G01P 2015/0814* (2013.01)

(58) Field of Classification Search
CPC ..................................... G01P 15/125
USPC .................................... 73/514.32
See application file for complete search history.

(56) References Cited

U.S. PATENT DOCUMENTS

| 5,487,305 A | * | 1/1996 | Ristic et al. ................ | 73/514.32 |
| 6,360,604 B1 | * | 3/2002 | Laermer et al. ............ | 73/514.38 |

* cited by examiner

*Primary Examiner* — John Chapman, Jr.
(74) *Attorney, Agent, or Firm* — North Weber & Baugh LLP

(57) ABSTRACT

The invention relates to a microelectro-mechanical structure (MEMS), and more particularly, to systems, devices and methods of compensating effect of thermo-mechanical stress on a micro-machined accelerometer by incorporating and adjusting elastic elements to couple corresponding sensing electrodes. The sensing electrodes comprise moveable electrodes and stationary electrodes that are respectively coupled on a proof mass and a substrate. At least one elastic element is incorporated into a coupling structure that couples two stationary electrodes or couples a stationary electrode to at least one anchor. More than one elastic element may be incorporated. The number, locations, configurations and geometries of the elastic elements are adjusted to compensate an output offset and a sensitivity drift that are induced by the thermo-mechanical stress accumulated in the MEMS device.

17 Claims, 5 Drawing Sheets

200

250

300

350

ACCELEROMETER WITH LOW SENSITIVITY TO THERMO-MECHANICAL STRESS

BACKGROUND

A. Technical Field

The present invention relates to a microelectromechanical structure, and more particularly, to systems, devices and methods of compensating effect of thermo-mechanical stress that causes offset and sensitivity drift in a corresponding sensing output.

B. Background of the Invention

A microelectromechanical structure (MEMS) is widely applied as a sensor to measure acceleration, rotation, pressure and many other physical parameters. The MEMS device is normally formed on a silicon substrate using a micromachining process, and thus, adopts characteristic feature sizes of several micrometers. Such miniaturized devices transduce mechanical movement to electrical signals that may indicate the level of the interested parameters. Examples of the MEMS device include accelerometers, gyroscopes, magnetometers, and pressure sensors. Various MEMS devices have been widely employed in applications ranging from common consumer products to specialized products used under extreme environments, and nowadays, they may be easily found in automotive parts, mobile phones, gaming devices, medical appliance, and military applications.

Many MEMS devices rely on capacitive sensing between a moveable electrode and a stationary electrode, and one example of such MEMS devices is a micro-machined accelerometer. The accelerometer comprises a proof mass that is suspended above a silicon substrate, and responds to acceleration with respect to a certain sensing axis. The moveable electrode and the stationary electrode are coupled on the proof mass and the stationary device substrate, respectively. Upon acceleration, the moveable electrode experiences a relative location change with respect to the stationary electrode, resulting in a capacitive change of the sensing capacitor formed between these two electrodes. To be specific, the capacitive change may be induced by variation of the capacitive gap or area of the sensing capacitor that is associated with the relative location change between the electrodes. In many prior art devices, this sensing capacitor is monitored with respect to another reference capacitor whose capacitance is maintained at a constant value regardless of the acceleration rate.

Thermo-mechanical stress may introduce an intrinsic mismatch between the sensing and reference capacitors, and ultimately, lead to offset or sensitivity drift to a sensing output even though no acceleration is applied to induce any capacitive change yet. In an ideal situation, the capacitive variation of the sensing capacitor should only be associated with the acceleration, and does not exist when no acceleration is involved. However, thermo-mechanical stress may be accumulated in the MEMS device during the course of manufacturing, soldering, packaging and device aging. Non-uniform stress builds up within the substrate and the device structure including the suspended proof mass, and unavoidably causes the substrate to warp and the proof mass to shift or tilt. In rare cases, the thermal stress impacts the sensing and reference capacitors equally, such that their gap and area variations might happen to cancel out and result in no capacitance mismatch between the capacitors. In most cases, the thermal stress impacts the sensing and reference capacitors differently. Various structures including the moveable and stationary electrodes are subject to different displacements. The sensing output from a sensor interface circuit may reflect such displacements resulting from the non-uniform thermal stress, and lead to an offset value and a sensitivity drift for the sensed acceleration.

Apparently, device performance of a capacitive accelerometer is compromised due to the thermo-mechanical stress. Such performance degradation is commonly shared by the MEMS devices that primarily rely on suspended proof masses and capacitive electrodes for transducing and sensing mechanical movement. There is a need to compensate the thermo-mechanical stress that builds up during the course of manufacturing, packaging, assembly and regular operation.

SUMMARY OF THE INVENTION

Various embodiments of the present invention relate to a microelectro-mechanical structure (MEMS), and more particularly, to systems, devices and methods of compensating effect of thermo-mechanical stress on a micro-machined accelerometer by incorporating and adjusting elastic elements in coupling structures that are used to couple stationary electrodes. The elastic elements effectively allows compensation of an output offset and a sensitivity drift that are related to a relative electrode position variation, and such a variation is basically induced by the thermo-mechanical stress accumulated in the MEMS device.

In accordance with the present invention, the MEMS device incorporates at least one elastic element on a coupling structure that couples the stationary electrode to at least one anchor on a substrate. Sensing electrodes of the MEMS device comprise a moveable electrode and the stationary electrode that are respectively coupled on a proof mass and the substrate. In prior art, the stationary electrode normally maintains rigid mechanical configuration and is coupled to the substrate via a rigid coupling structure, such that the stationary electrode is not susceptible to mechanical stress or inertial movement. In various embodiments of the present invention, the elastic element is incorporated into the coupling structure to partially or entirely replace the coupling structure. The elastic element is coupled at a specific location on the coupling structure, and the configuration and geometry may be further adjusted.

In accordance with the present invention, the MEMS device may comprise more than one stationary electrode. Elastic elements are coupled on the coupling structures that are used for coupling the stationary electrodes to anchors and/or for inter-electrode coupling among different stationary electrode sets. In addition to the locations, configurations and geometries, the number of the elastic elements is also adjusted to compensate the variation of the relative electrode positions induced under the impact of the thermo-mechanical stress.

In one embodiment of the invention, the stationary electrodes included in the MEMS device are grouped into electrode sets according to the impact of the thermo-mechanical stress. Elastic elements are coupled on the coupling structures that are used for coupling the electrode sets to the substrate and/or for inter-electrode coupling within an electrode set.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
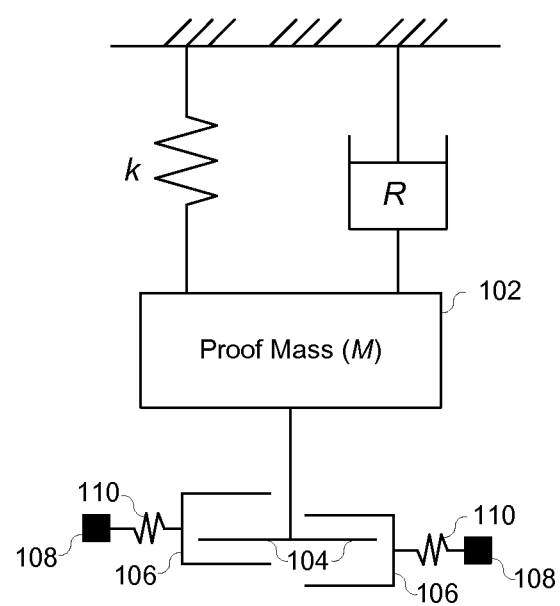
FIG. 1 illustrates an exemplary block diagram of a MEMS device according to various embodiments in the invention.

FIG. 1 illustrates an exemplary block diagram 100 of a MEMS device according to various embodiments in the invention. The MEMS device comprises a proof mass 102 and several sensing electrodes that further include at least one moveable electrode 104 and one stationary electrode 106. The proof mass 102 is suspended above a substrate, and responds to inertial movement, such as acceleration and rotation, of the MEMS device 100 by displacing and tilting with respect to its nominal position. The moveable electrode 104 is attached to the proof mass 102, and capacitively coupled to the stationary electrodes 106. In various embodiments of the invention, elastic elements 110 are incorporated to mechanically couple the stationary electrodes 106 to anchors 108 on the substrate. These elastic elements 110 are further adjusted to compensate impact of thermo-mechanical stress on the MEMS device 100 while not compromising its sensitivity to the inertial movement.

Movement of the proof mass 102 is transferred to the moveable electrode 104, and results in a variation of a relative position between the moveable electrode 104 and the stationary electrodes 106. In FIG. 1, a simple mass-spring-damper (M-k-R) system is applied to illustrate the mechanism concerning how the proof mass 102 responds to the inertial movement. In response to certain acceleration, the proof mass 102 displaces by a displacement, x, under a certain damping level. In one embodiment, such a displacement directly causes gap variation between the moveable electrode 104 and the stationary electrodes 106, while in another embodiment, the displacement may be associated with variation of overlapping areas between these electrodes. When the electrodes are capacitively coupled to an interface readout circuit, the variation of the relative electrode position is electrically converted to a sensing output that indicates a magnitude of corresponding inertial parameters, such as acceleration and a rotation rate.

Even though the variation of the relative electrode position is preferably associated with the inertial movement only, it may be induced by other disturbances including thermo-mechanical stress accumulated in the MEMS device 100. Due to the thermo-mechanical stress, the substrate may warp, and the proof mass 102 may deform, leading to minor displacements of the moveable and stationary electrodes. So does the relative electrode position between these electrodes vary, and furthermore, such stress-based variation of the relative electrode position may be undesirably incorporated into the sensing output as an output offset, and cause a sensitivity drift for the sensed inertial parameter.

To compensate the effect of the thermo-mechanical stress, each elastic element 110 is incorporated to partially or entirely replace a coupling structure that is used to couple one stationary electrode 106. In a preferred embodiment, the elastic element 110 is incorporated in the coupling structure that couples the stationary electrode 106 and a corresponding anchor 108 on the substrate; however, in some embodiments, the elastic element 110 is also incorporated in the coupling structure that couples two stationary electrodes 106.

In prior art, such stationary electrodes 106 and coupling structures normally maintain rigid mechanical configuration so as to reduce their susceptibility to inertial movement or other potential disturbances. However, in various embodiments of the invention, elastic elements 110 may be flexibly applied to introduce a certain level of mechanical elasticity. More than one elastic element 110 may be applied on one coupling structure or different coupling structures. Each elastic element 110 is placed at a specific location at the coupling structure of the stationary electrode 106. The location, configuration and geometry of each elastic element are controlled to offer a desirable mechanical property. The mechanical property enables the elastic elements 110 to shift the stationary electrodes 106 during the course of manufacturing, assembling and utilizing the MEMS device, substantially compensating acute or chronic effect of the thermo-mechanical stress.

The elastic elements 106 are controlled to be substantially insensitive to inertial movement that the MEMS device 100 is proposed to detect. Due to such a sensitivity requirement, the elastic elements 110 have to be specifically configured and arranged to differentiate their sensitivities to the inertial movement and to the thermo-mechanical stress. It is obvious to those skilled in the art that the flexibility of the elastic elements 110 is significantly lower than those mass elastic elements k adopted to suspend the proof mass 102.

In some embodiments, the elastic elements 110 are separately configured. The location, configuration and geometry for each elastic element are determined to efficiently compensate the thermo-mechanical stress that may not be uniform or symmetric in the MEMS device 100. The specific locations of the elastic elements 110 may be distinct and asymmetric on the coupling structures associated with the stationary electrodes 106. Likewise, the configurations and geometries may be different for the elastic elements 110. Therefore, the elastic elements 110 may be individually arranged to efficiently compensate the thermo-mechanical stress, regardless of whether the stationary electrodes 106 are identical or symmetric.

Figure 2A:
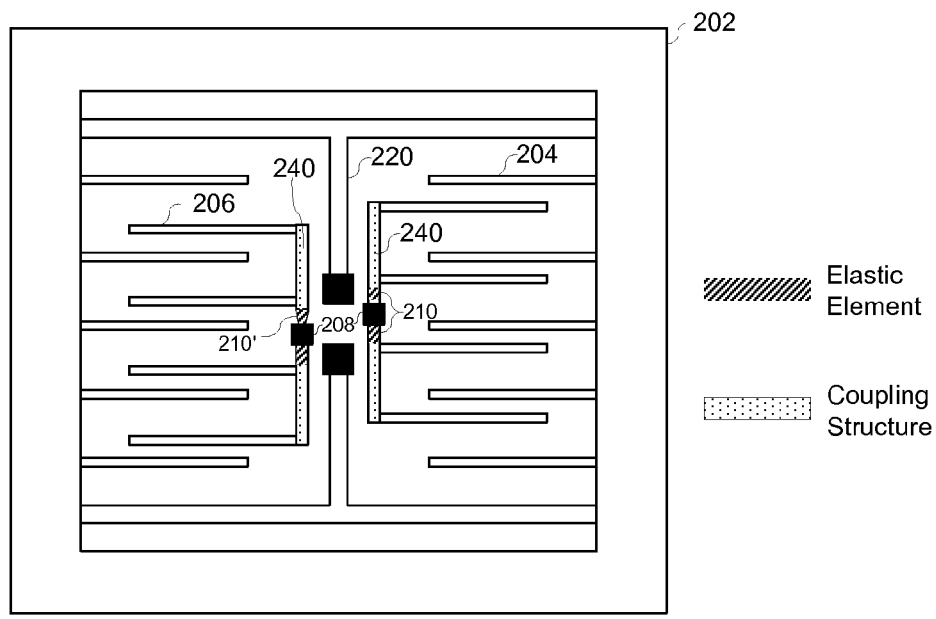
FIG. 2A illustrates an exemplary block diagram of a MEMS device that is anchored within its central opening according to various embodiments in the invention.

FIG. 2A illustrates an exemplary block diagram 200 of a MEMS device that is anchored within its opening according to various embodiments in the invention. A proof mass 202 is mechanically coupled to anchors on a substrate, but suspended above the substrate using elastic elements 220. The proof mass 202 is attached with moveable electrodes 204 that may track inertial movements experienced by the proof mass 202. The moveable electrodes 204 are further coupled to stationary electrodes 206 that are anchored at anchors 208. Coupling structures 240 are used not only to couple two stationary electrodes 206 but also to couple a stationary electrode 206 to an anchor 208. At least one of the coupling structures 240 partially includes or is entirely made of an elastic element 210 for the purpose of compensating thermo-mechanical stress.

In this embodiment, the proof mass 202 is not a solid body, but a structure that includes an opening at a certain area. The certain area is preferably arranged in a central area of the proof mass 202, although it is not required to be so arranged. The electrodes, anchors, coupling structures and elastic elements are arranged within this opening, and encompassed by the proof mass 202.

In this embodiment, the stationary electrodes 206 are grouped into four sets of electrodes that are not necessarily symmetrically arranged with respect to their anchors 208. Each electrode set is independently coupled using at least one elastic element 210, and the geometry of each elastic element 210 may be adjusted as needed. One exemplary elastic element 210' may have a width or a length that is not consistent with that of the corresponding coupling structure 240. In some embodiments, the elastic elements 210 do not have to adopt uniform geometry, and their widths may be tapered at different angles along their lengths.

Figure 2B:
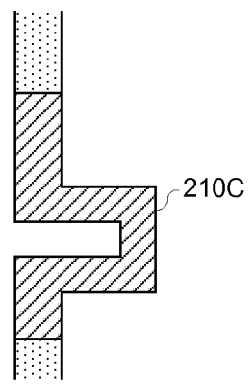
FIG. 2B illustrates an exemplary diagram of an elastic element that adopts a particular configuration, i.e., a detour, according to various embodiments of the invention.

FIG. 2B illustrates an exemplary diagram 250 of an elastic element 210C that adopts a particular configuration, i.e., a detour, according to various embodiments of the invention. The size, position and shape of the detour are determined according to the stress-related variation of the relative electrode location. In one embodiment, more than one detour may be applied to couple one set of stationary electrodes. In another embodiment, distinct detours are used for two separate sets of stationary electrodes, and these detours may have different sizes, shapes or locations. The number of the detours is also determined according to the impact of the thermo-mechanical stress and the configuration of the elastic elements.

Figure 3A:
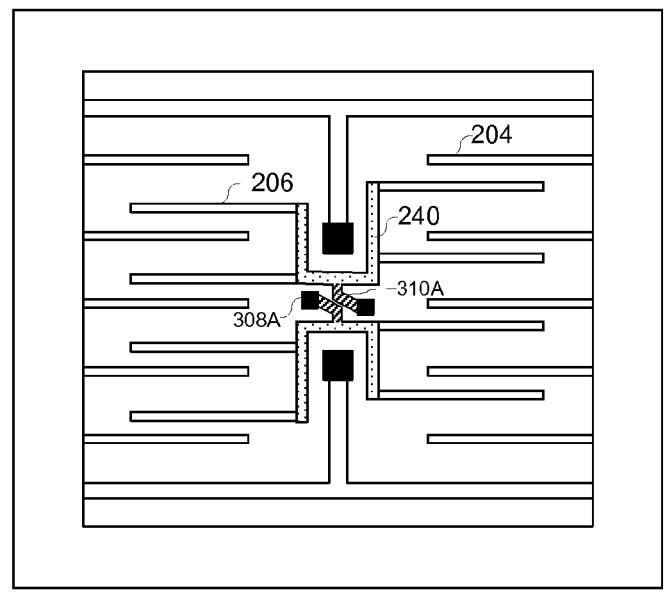
FIGS. 3A and 3B illustrate exemplary arrangements of stationary electrodes that are coupled to anchors on a substrate using elastic elements according to various embodiments in the invention.
Figure 3B:
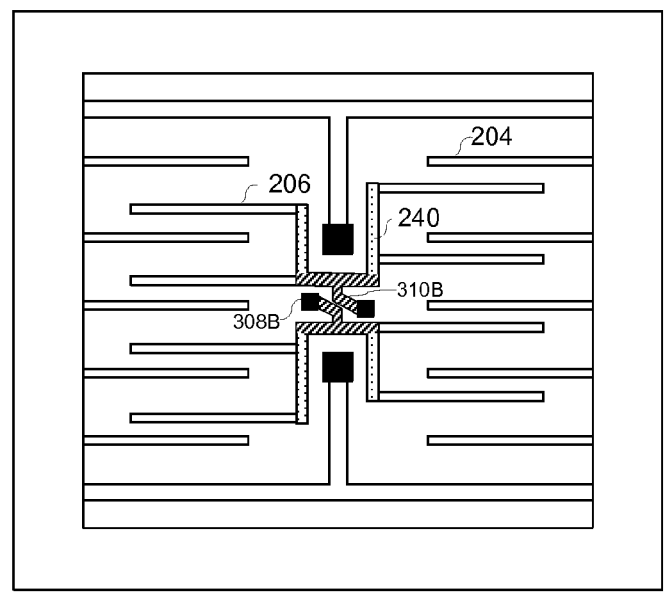

FIGS. 3A and 3B illustrate exemplary arrangements 300 and 350 of stationary electrodes that are coupled to anchors on a substrate using elastic elements according to various embodiments in the invention. The same stationary electrodes 206 in FIG. 2A are applied for sensing purposes, and they are still grouped into four sets of electrodes. Unlike FIG. 2A, the electrode sets in FIGS. 3A and 3B are not independently coupled to the anchors, but are cross-coupled among themselves prior to being coupled to the anchors. In FIG. 3A, the top two stationary electrode sets are coupled using a rigid coupling structure, and further coupled to an anchor 308A using an elastic element 310A. In FIG. 3B, the top two stationary electrode sets and an anchor 308B are coupled using a T-shaped elastic element 310B. In both arrangements 300 and 350, the bottom two electrode sets may adopt similar arrangement of the corresponding two top electrode sets, or independently configured.

One of those skilled in the art knows that the number of electrode sets and the coupling arrangement are determined by the impact of the thermo-mechanical stress. FIGS. 2A, 3A and 3B are exemplary arrangements applied to show that locations, configurations and geometries of elastic elements may be flexibly adjusted for efficient stress compensation. The invention disclosure is not limited to the aforementioned embodiments.

Figure 4:
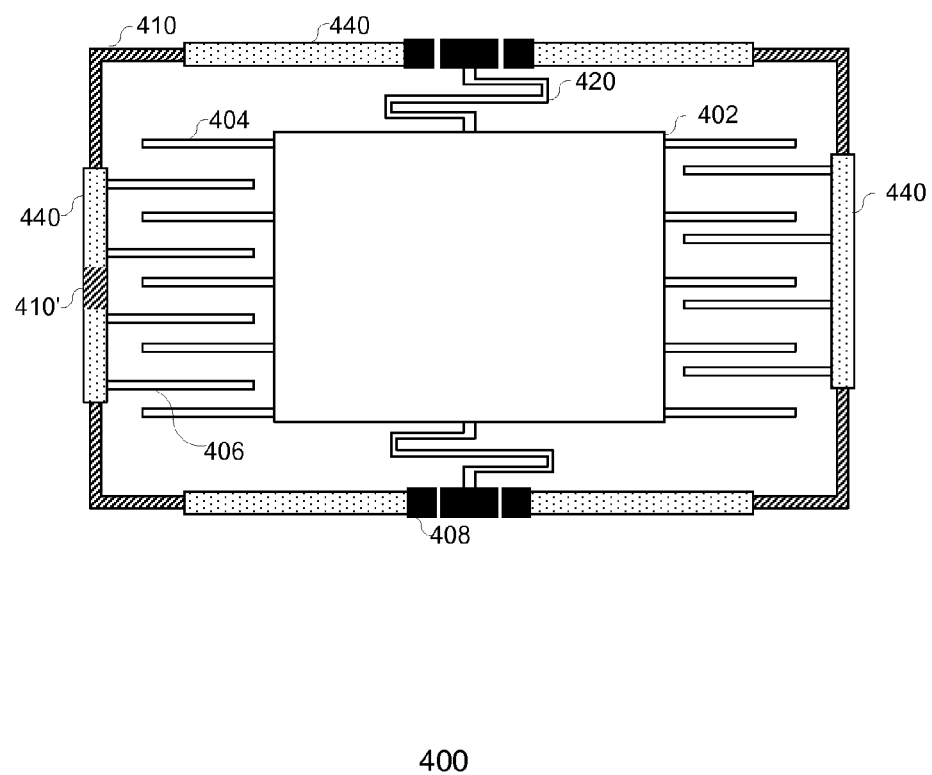
FIG. 4 illustrates an exemplary block diagram of a MEMS device that is anchored around a perimeter according to various embodiments in the invention.

FIG. 4 illustrates an exemplary block diagram 400 of a MEMS device that is anchored around a perimeter of a proof mass according to various embodiments in the invention. The MEMS device 400 comprises a proof mass 402, moveable electrodes 404, stationary electrodes 406, anchors 408 and elastic elements 410. In this embodiment, the electrodes, anchors, coupling structures and elastic elements are arranged around the perimeter of and encompass the proof mass 402. The proof mass 402 is mechanically coupled to a substrate using mass elastic elements 420, and these mass elastic elements 420 are attached to two opposite edges of the proof mass 402. The moveable electrodes 404 are attached to the other two opposite edges of the proof mass 402.

The stationary electrodes 406 are grouped into two electrode sets on two sides of the proof mass 402. Each electrode set is coupled to two corresponding anchors 408 via an angled elastic element 410 and a straight coupling structure 440. Although the coupling structure 440 is normally rigid, the elastic element 410 is flexible. The stiffness of the elastic elements 410 is adjustable by varying its configuration and geometry. In this embodiment, the elastic element 410 is bended to a 90-degree angle conformal to the shape of the proof mass 402, and the width of the elastic element 410 is less than that of the coupling structure 440. Although four elastic elements 410 are symmetrically applied, one of those skilled in the art knows that the number, locations, geometries and configurations of these elastic elements 410 are adjustable, as long as the thermo-mechanical stress accumulated in the MEMS device 400 may be better compensated.

In some embodiments, an elastic element 410' may be arranged on the coupling structure 440 between two stationary electrodes 406. The elastic element 410' is not necessarily in close proximity to the anchors 408, and however, may effectively provide targeted and localized compensation for the stress-related variation of the relative electrode position near a corresponding electrode region.

As discussed above, the mass elastic elements 420 and the elastic elements 410 are configured differently in order to achieve different goals. The mass elastic elements 420 are arranged to provide desirable response to inertial movement for the MEMS device 400. However, the elastic elements 410 have to be controlled to compensate the thermo-mechanical stress, but being inert to the impact of the inertial movement. As a result, the elastic elements 410 may be substantially stiffer than the mass elastic elements 420.

Figure 5:
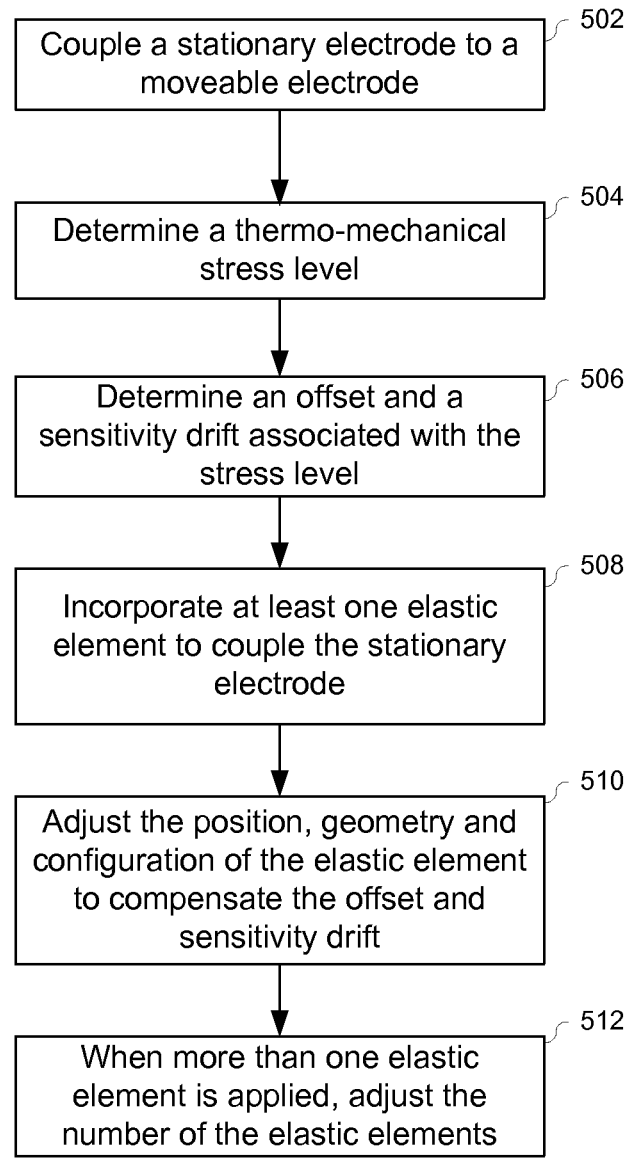
FIG. 5 illustrates an exemplary flow chart of a method of compensating thermo-mechanical stress according to various embodiments in the invention.

FIG. 5 illustrates an exemplary flow chart 500 of a method of compensating thermo-mechanical stress according to various embodiments in the invention. The thermo-mechanical stress causes variation to a relative electrode position of a sensing capacitor in a MEMS device. This method 500 is applied to compensate the stress-related variation of the relative electrode position by adjusting a position of sensing electrodes, and particularly, a stationary electrode. At step 502, the stationary electrode is coupled to a moveable electrode that is attached to a proof mass in the MEMS device. The stationary and moveable electrodes constitute sensing electrodes of the sensing capacitor. Movement of the proof mass leads to a capacitive variation of the sensing capacitor that is further converted to a sensing output. In some embodiments, the sensing output is associated with an inertial parameter, such as an acceleration and a rotation rate, when the MEMS device constitutes an accelerometer or a gyroscope.

At step 504, a thermo-mechanical stress level is determined for the structure. In one embodiment, empirical or simulated thermo-mechanical stress levels are recorded for different devices that are manufactured, packaged and assembled according to a particular procedure. These empirical or simulated thermo-mechanical stress levels are analyzed using a Monte Carlo method to provide a nominal stress level that may be used to configure the elastic elements.

At step 506, the thermo-mechanical stress level is converted to determine an offset value and a sensitivity drift of the sensing output. Such an offset value and a sensitivity drift are associated with the thermo-mechanical stress level. At step 508, at least one elastic element is incorporated to couple the stationary electrode, and particularly to another stationary electrode or to an anchor on the substrate. At step 510, the location, geometry and configuration of each claim element are adjusted to compensate the offset and the sensitivity drift.

In various embodiments of the invention, more than one elastic element is applied, and the elastic elements may adopt various widths, lengths and shapes, or incorporate one or a number of detours. At step 512, when more than one elastic element is applied, the number of the elastic element is adjusted to better compensate the offset and sensitivity drift as well.

It is obvious to one of those skilled in the art that the stress compensation technique disclosed in the invention is widely applicable to the MEMS structures in various sensor applications. One typical application is a single axis inertial sensor, such as an accelerometer or a gyroscope. This technique is simple to implement, but may effectively compensate the variation of the relative electrode position caused by the thermo-mechanical stress. As a result, device performance may be improved, particularly for the output offset and sensitivity drift of the sensed inertial parameters as acceleration and rotation rates.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A micro-machined inertial sensor, comprising:
   a proof mass that is suspended above a substrate and attached with a moveable electrode;
   a plurality of stationary electrodes, electrically coupled to the moveable electrode, the plurality of stationary electrodes forming a sensing capacitor with the moveable electrode such that movement of the proof mass leads to a capacitive variation of the sensing capacitor that is further converted to a sensing output; and
   wherein the plurality of stationary electrodes is coupled to at least one anchor on the substrate via a coupling structure that incorporates at least one elastic element, at least one elastic element being incorporated to couple two stationary electrodes of the plurality of stationary electrodes.

2. The micro-machined inertial sensor according to claim 1, wherein the proof mass includes an opening, and the stationary electrode, the moveable electrode, the at least one anchor, the coupling structure and the at least one elastic element are encompassed by the proof mass.

3. The micro-machined inertial sensor according to claim 1, wherein the stationary electrode, the moveable electrode, the at least one anchor, the coupling structure and the at least one elastic element are arranged around a perimeter of the proof mass.

4. The micro-machined inertial sensor according to claim 3, wherein the at least one elastic element is angled to conform to the perimeter.

5. The micro-machined inertial sensor according to claim 1, wherein the at least one elastic element adopts a non-uniform geometry in which the width is tapered along the length.

6. The micro-machined inertial sensor according to claim 1, wherein the at least one elastic element includes a detour structure, a size, position and shape of the detour being determined according to the impact of thermo-mechanical stress.

7. A method of compensating thermo-mechanical stress accumulated in a microelectromechanical structure, comprising the steps of:
   coupling a plurality of stationary electrodes to at least one moveable electrode that is attached to a proof mass, the stationary electrodes forming a sensing capacitor with the at least one moveable electrode such that movement of the proof mass leads to a capacitive variation of the sensing capacitor that is further converted to a sensing output;
   determining a level of the thermo-mechanical stress that is accumulated in the structure and impacts the sensing capacitor;
   determining an offset value and a sensitivity drift associated with the sensing output according to the level of the thermo-mechanical stress;
   incorporating at least one elastic element on a coupling structure that couples between two stationary electrodes;
   incorporating at least one elastic element on a coupling structure that couples the stationary electrodes to at least one anchor on a substrate; and
   selecting location, geometry and configuration of the at least one elastic element so as to compensate the offset value and the sensitivity drift.

8. The method according to claim 7, wherein the proof mass includes an opening, and the stationary electrodes, the moveable electrode, the at least one anchor, the coupling structure and the at least one elastic element are encompassed by the proof mass.

9. The method according to claim 7, wherein the at least one elastic element adopts a non-uniform geometry in which the width is tapered along the length.

10. The method according to claim 7, wherein the at least one elastic element includes a detour structure, a size, position and shape of the detour being determined according to the impact of the thermo-mechanical stress.

11. A microelectromechanical structure that compensates thermo-mechanical stress, comprising:
a proof mass that is suspended above a substrate and attached with at least one moveable electrode;
a plurality of stationary electrodes, electrically coupled to the at least one moveable electrode, the plurality of stationary electrodes forming at least one sensing capacitor with the at least one moveable electrode such that movement of the proof mass leads to a capacitive variation of the at least one sensing capacitor; and
wherein a plurality of coupling structures are used to couple the plurality of stationary electrodes among each other and to at least one anchor on the substrate, a plurality of elastic elements being incorporated on at least one of the plurality of coupling structures, to compensate impact of the thermo-mechanical stress on the at least one sensing capacitor, at least one in the plurality of elastic elements being incorporated between two stationary electrodes of the plurality of stationary electrodes.

12. The microelectromechanical structure according to claim 11, wherein the plurality of stationary electrodes are grouped into a plurality of electrode sets, at least one elastic element in the plurality of elastic elements being incorporated on a first coupling structure that couples one of the plurality of electrode sets to the at least one anchor.

13. The microelectromechanical structure according to claim 11, wherein the plurality of stationary electrodes are grouped into a plurality of electrode sets, two electrode sets in the plurality of electrode sets being coupled by a second coupling structure to reduce the impact of the thermo-mechanical stress, the coupled two electrode sets being further coupled to the substrate via a third coupling structure.

14. The microelectromechanical structure according to claim 13, wherein at least one elastic element in the plurality of elastic elements is incorporated on at least one coupling structure of the second and third coupling structures.

15. The microelectromechanical structure according to claim 11, wherein the proof mass includes an opening, and the plurality of stationary electrodes, the plurality of moveable electrodes, the at least one anchor, the plurality of coupling structures and the plurality of elastic elements are encompassed by the proof mass.

16. The microelectromechanical structure according to claim 11, wherein at least one elastic element adopts a non-uniform geometry in which a width is tapered along a length.

17. The microelectromechanical structure according to claim 11, wherein at least one elastic element includes a detour structure, a size, position and shape of the detour being determined according to the impact of the thermo-mechanical stress.

* * * * *